(12) United States Patent
Hahn et al.

(10) Patent No.: US 9,976,669 B2
(45) Date of Patent: May 22, 2018

(54) CONTAINER TREATMENT PLANT AND METHOD FOR DISPLACING A VALVE OR A DIVERTING UNIT OF A CONTAINER TREATMENT PLANT

(71) Applicant: KRONES AG, Neutraubling (DE)

(72) Inventors: Wolfgang Hahn, Neutraubling (DE); Eduard Handschuh, Donaustauf (DE); Klaus Voth, Obertraubling (DE); Dieter Finger, Neutraubling (DE); Florian Geltinger, Donaustauf (DE); Hartmut Davidson, Zeitlarn (DE); Martin Seger, Neumarkt (DE)

(73) Assignee: KRONES AG, Neutraubling (DE)

( * ) Notice: Subject to any disclaimer, the term of this patent is extended or adjusted under 35 U.S.C. 154(b) by 0 days. days.

(21) Appl. No.: 15/033,038

(22) PCT Filed: Sep. 29, 2014

(86) PCT No.: PCT/EP2014/070799
§ 371 (c)(1),
(2) Date: Apr. 28, 2016

(87) PCT Pub. No.: WO2015/062800
PCT Pub. Date: May 7, 2015

(65) Prior Publication Data
US 2016/0245423 A1    Aug. 25, 2016

(30) Foreign Application Priority Data
Oct. 30, 2013    (DE) .......................... 10 2013 111 933

(51) Int. Cl.
*B65G 25/00* (2006.01)
*F16K 31/04* (2006.01)
(Continued)

(52) U.S. Cl.
CPC .............. *F16K 31/04* (2013.01); *B29C 49/08* (2013.01); *B29C 49/28* (2013.01); *B29C 49/421* (2013.01);
(Continued)

(58) Field of Classification Search
CPC ...................................................... B65G 47/71
(Continued)

(56) References Cited

U.S. PATENT DOCUMENTS 6,729,553 B1 *  5/2004  Hlousek ............... F02M 59/366
                                                          239/88
8,177,076 B2 *  5/2012  Rataiczak, III ........... A47F 1/00
                                                         211/59.3
(Continued)

FOREIGN PATENT DOCUMENTS

CN          102076990 A      5/2011
DE     10 2007 037995 A      2/2009
(Continued)

OTHER PUBLICATIONS

Authors: Keith Kowalski & Robert Pulford, Design World Staff, Title: Convert Rotary Motion to Linear—From the Inside, Date: Aug. 23, 2007, Publisher: Design World Online.*
(Continued)

*Primary Examiner* — Gene O Crawford
*Assistant Examiner* — Lester Ill Rushin
(74) *Attorney, Agent, or Firm* — Walter | Haverfield LLP; D. Peter Hochberg; Sean F. Mellino

(57) ABSTRACT

A container treatment plant and a method for displacing an element of a valve or a diverting unit of a container treatment plant. The container treatment plant comprises at least one element for treating containers. The element is part of a valve or a diverting unit. The container treatment plant also comprises a displacing unit for displacing the element
(Continued)

between a first position and a second position, wherein the displacing unit comprises a magnetically operating actuator such that a rotary motion caused by the actuator displaces the element with the aid of a mechanism between its first and second positions.

14 Claims, 3 Drawing Sheets

(51) Int. Cl.
| | |
|---|---|
| *F16K 31/52* | (2006.01) |
| *B29C 49/42* | (2006.01) |
| *B29C 49/08* | (2006.01) |
| *B29C 49/28* | (2006.01) |
| *B29C 49/58* | (2006.01) |
| *B65B 39/00* | (2006.01) |
| *B65G 47/71* | (2006.01) |
| *B29L 31/00* | (2006.01) |

(52) U.S. Cl.
CPC ...... *B29C 49/4273* (2013.01); *B29C 49/4289* (2013.01); *B29C 49/58* (2013.01); *B65B 39/001* (2013.01); *F16K 31/047* (2013.01); *F16K 31/52* (2013.01); *B29C 2049/5803* (2013.01); *B29C 2049/5879* (2013.01); *B29L 2031/712* (2013.01); *B65G 47/71* (2013.01)

(58) Field of Classification Search
USPC ..... 198/439, 355, 369.1, 369.2, 409, 468.01
See application file for complete search history.

(56) References Cited

U.S. PATENT DOCUMENTS

| | | | |
|---|---|---|---|
| 2005/0017724 A1* | 1/2005 | McQueeney | F23Q 23/00 324/380 |
| 2007/0254097 A1* | 11/2007 | Danel | B05D 1/62 427/238 |
| 2011/0233838 A1* | 9/2011 | Kramer | B65C 3/16 269/56 |
| 2012/0175224 A1* | 7/2012 | Briggs | B65G 47/846 198/478.1 |
| 2012/0181757 A1 | 7/2012 | Oteman et al. | |
| 2013/0164404 A1* | 6/2013 | Maki | B29D 22/003 425/535 |

FOREIGN PATENT DOCUMENTS

| | | | | |
|---|---|---|---|---|
| DE | 10 2012 201059 A1 | 7/2013 | | |
| DE | 10 2012 017705 A | 3/2014 | | |
| DE | 102013111932 A1 * | 4/2015 | ......... | B65G 21/2072 |
| FR | 2745522 A1 | 9/1997 | | |
| WO | 82/01697 A1 | 5/1982 | | |
| WO | 03/029679 A1 | 4/2003 | | |
| WO | WO 2010027701 A1 * | 3/2010 | ........... | B60G 13/001 |

OTHER PUBLICATIONS

Enlarged picture of "U" reference figure.*
International Search Report of PCT/EP2014/070799 dated Jan. 26, 2015.
Written Opinion of PCT/EP2014/070799.
Written Opinion of PCT/EP2014/070799 dated Jan. 26, 2015 with English translation.
Office Acton for corresponding CN Application No. 201480057733.7 dated Apr. 14, 2017.

* cited by examiner

CONTAINER TREATMENT PLANT AND METHOD FOR DISPLACING A VALVE OR A DIVERTING UNIT OF A CONTAINER TREATMENT PLANT

CROSS-REFERENCE TO RELATED APPLICATIONS

This application a 371 National Stage application of International Application No. PCT/EP2014/070799, filed on Sep. 29, 2014, which claims foreign priority to German (DE) Application Serial No. 10 2013 111 933.6 filed on Oct. 30, 2013, the contents of both of which are incorporated herein by reference in their entireties.

BACKGROUND OF THE INVENTION

Field of the Invention

The present invention relates to a container treatment plant and method for displacing an element of a valve or a diverting unit of a container treatment plant.

Description of the Prior Art

In a container treatment plant, a plurality of containers are transported between different container treatment stations, like a stretch blow molding machine, a labeling unit, an inspection unit, a filling unit, a cleaning unit, etc. by using one or more different transporting unit(s). The containers are treated in the different container treatment stations by the use of valves, like blowing valve, filling valve, etc., and/or diverting units, like pusher, hedgehog, etc.

Valves and diverting units each comprise an element that is to be displaced between a first position and a second position. Concerning a valve, the element is to be moved between an opened position and closed position, which are the both end positions, of the valve. Herein, also intermediate positions located between the both end positions shall be possible if necessary. In the diverting unit, the element is to be moved between a first position, in which no diversion of the container takes place, and a second position causing the diversion of the container. Where required, intermediate positions shall be possible between the both positions, as well. With current valves and diverting units, usually, only two positions like open/closed are possible, but no intermediate positions are possible therebetween. Currently, intermediate positions can be realized only by an additional mechanically displaceable stop, which is intricate and thus expensive.

It is further problematic that the displacement of the elements of the valves and diverting units has to be effected adapted to a production speed of the container treatment plant of, for example, up to 40,000 containers per hour or a speed of the containers of approximately 2 m per second. Thus, the displacement of the valves and diverting units has to be effected very fast and further also very precise to cause no plant down time. Plants down times bring about losses of production and require the use of operating personal so that the production costs augment.

For the displacement of the valves and diverting units in such a container treatment plant are used so far different mechanisms which are operated by compressed air, where required. The mechanisms are depending on the construction liable to wear and thus maintenance-intensive. There is a significant diversity of the switching time of presently +/−2 msec as regards the valves and diverting units. Because of this, more control air is necessary so that consumption of compressed air increases. However, compressed air is comparably expensive. Moreover, the response times of the valves and diverting units are longer than desired because of a switching edge until the increase of the pressure.

SUMMARY OF THE PRESENT INVENTION

Thus, it is an object of the present invention to provide a container treatment plant and a method for displacing an element of a valve or a diverting unit of a container treatment plant, with which the above-mentioned problems can be solved. In particular, a container treatment plant and a method for displacing an element of a valve or a diverting unit of a container treatment plant shall be provided, in which the displacement of the element and thus the valve and or the diverting unit can be realized easy, precise, fast, variable, reliable, with low maintenance, and cheap.

This object is solved by a container treatment plant according to the presently claimed invention. The container treatment plant comprises at least one element for treating containers, wherein the element is part of a valve or a diverting unit, and a displacing unit for displacing the element between a first position and a second position, wherein the displacing unit comprises an magnetically operating actuator such that a rotary motion caused by the actuator displaces the element with the aid of a mechanism between its first and its second positions.

In the container treatment plant, the displacement of the element, and thus the valve or the diverting unit, can be performed very precise and fast, however, still very easy and cheap. Thus, the displacement of the element can be effected with precision even for a production speed of the container treatment plant of for example up to 40,000 containers per hour or a speed of the containers of approximately 2 m per second.

In addition, if necessary, intermediate positions between the both end positions of the valve or the diverting unit can be reached. Therewith, the valve or the diverting unit is useable very variably. Further, the displacing unit comprises thus a restricting function so that an additional choke or restrictor can be omitted. Therefrom results a more compact construction of the valve or the diverting unit.

The actuator is very robust and the mechanism is constructed very easy. Therewith, the displacing unit is very less liable to wear and thus low in maintenance. Thus, the displacing unit for displacing the element and therewith the valve or the diverting unit has a high life time. Moreover, the displacing unit for displacing the element of a valve or a diverting unit can be diagnosed or is observable without additional effort.

Moreover, the switching time diversity can be reduced down to +0 msec by the displacing unit for displacing the element and thus the valve or the diverting unit. Therewith, the valve or the diverting unit has an invariant switching behavior. Altogether, with the displacing unit for displacing the element and thus the valve or the diverting unit results a better container quality and no expensive and energy intensive compressed air is necessary anymore.

A further advantage of the displacing unit for displacing the element and thus the valve or diverting unit lies in that the displacing unit can be retrofit easily or that existing plants can easily be converted therewith.

Advantageous further developments of the container treatment plant are given in the depended claims.

It is possible that the mechanism is configured such that a rotary motion caused by the actuator is transformed into a linear motion between the first and second positions.

In the container treatment plant, the valve possibly comprises a deflectable rod which is coupled in such a way with a rotor of the actuator and a guiding rod that a rotary motion caused by the actuator is transformed into a linear motion of the guiding rod, or the valve has a tubular piston comprising an external indentation which is coupled with an inner indentation of the actuator such that a rotary motion caused by the actuator is transformed into a linear motion of the tubular piston.

In the above-mentioned version of the valve, the outer indentation can be implemented as a threaded rod, and/or the outer indentation and the inner indentation can form a transmission that is implemented self-locking and/or the play thereof is adjustable. Further, the tubular piston can be a tubular piston which is equilibrated as regards the pressure and/or the tubular piston can comprise a rotation protection against rotating around its own axis.

In the container treatment plant is possibly integrated into the valve an electric control unit for controlling the actuator. Therewith, a particular compact assembly can be achieved.

The valve can comprise a housing which comprises a housing cover and which is sealed against a pressure of up to approximately 40 bar and in which the displacing unit is mounted. Such a valve is suitable as a blowing valve of a stretch blow molding machine.

The above-described valve can be a filling valve of a filling unit for filling at least one medium in a container or the valve can be a blowing valve of a stretch blow molding machine.

The actuator of the container treatment plant can be a 4-terminal direct current actuator which is operable with magnetism between two positions. In particular, the actuator can be driven to arbitrary positions between the both positions and be held there.

The container treatment plant can also be configured such that a plurality of diverting units are arranged in one row side by side to each other and that a cam disc drivable by the actuator is positioned in such a way relative to the row of diverting units that a rotation of the cam disc about its own axis because of rotation of the actuator causes that every cam of the cam disc one after the other touches one of the diverting unit and transfers it therewith into a linear motion, to move the diverting unit from the first position into the second position. As an alternative to the cam disc, there can also be positioned a plurality of actuators one after another to satisfied the above-described function. Herein, for example, every actuator can transfer one of the diverting units into a linear motion.

The above-described container treatment plant can further comprise a control unit for controlling the actuator such that its rotor accelerates starting from a working point and that the actuator is switched to a currentless state when approaching another working point, so that the rotor sweeps through said working point due to the mass inertia of the rotor or the mass inertia of a mounted load and then the rotor can be operated again by a voltage reversal in the same direction as before to achieve a discrete true running of the actuator around its axis. Therewith, the displacing unit is useable in a further advantageous way.

In the above-described container treatment plant, the element is for example part of a transport star for transporting of containers and/or a pusher and/or is part of a goad aggregate and/or part of a labeling carrier and/or part of a diverting turnout. Thus, the element and therewith the valve or the diverting unit can be applied in many fields of the container treatment plant. Therewith, the acquisition and operating costs of the container treatment plant can be diminished and the reliability of the plant can be increased.

The object is further solved by a method for displacing an element of a valve or a diverting unit of a container treatment plant according to the presently claimed invention. The container treatment plant comprises at least one element for treating containers, wherein the element is part of the valve or the diverting unit. The method comprises the step of displacing, by a displacing unit, of the element between a first position and a second position, wherein the displacing unit comprises a magnetically operating actuator such that a rotary motion caused by the actuator displaces the element with the aid of a mechanism between its first and its second positions.

The method achieves the same advantages as mentioned above in respect of the container treatment plant.

Further possible implementations of the invention comprise also combinations of features or styles described above or in the following with reference to the embodiments, even if they are not explicitly mentioned. Herein, the person skilled in the art will also add single aspects as improvements or additions to the respective basic form of the invention.

BRIEF DESCRIPTION OF THE DRAWINGS

In the following, the invention is described in more detail by means of embodiments and with reference to the appended drawing Figures, wherein.

In the figures, the same or functionally same elements are provided with the same reference signs unless given otherwise.

DETAILED DESCRIPTION OF THE PRESENT INVENTION

Figure 1:
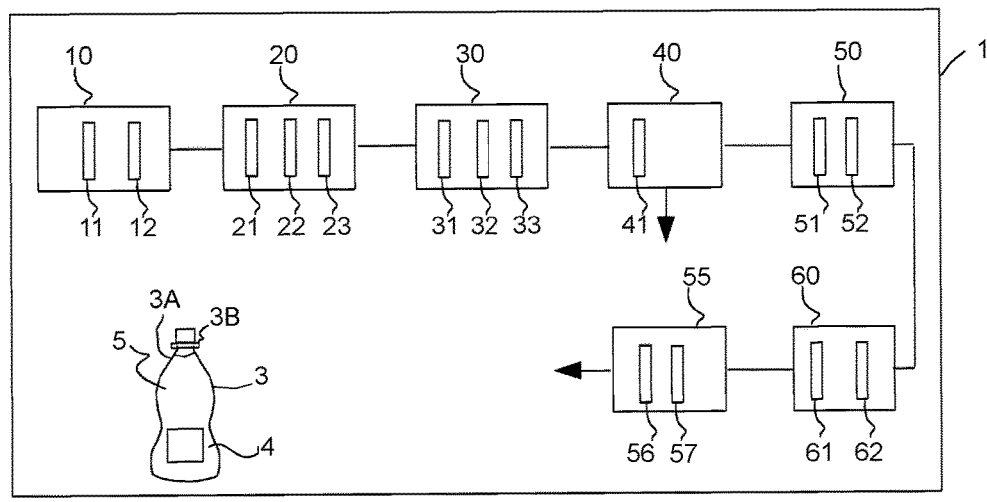
FIG. 1 shows a severely simplified block diagram of a container treatment plant according to a first embodiment.

FIG. 1 shows an example for a container treatment plant 1 in which containers 3 having a neck 3A and optionally a neck ring 3*b* can be treated. The container treatment plant 1 in FIG. 1 comprises a stretch blow molding machine 10, a transport star 20, an inspection unit 30, a diverting turnout 40, as well as a first and second filling unit 50, 55 downstream of which is positioned a labeling unit 60. The stretch blow molding machine 10 can form containers 3 by blowing compressed air by the use of blow valves 11, 12 into preforms. The transport star 20 grabs with its clamps 21, 22, 23 the containers 3 and transports them to the inspection unit 30 in which the containers 3 are inspected as regard defects. Defective containers 3 are diverted out of the container stream by the use of pushers 31, 32, 33. The other containers 3, namely the containers 3 without defects, are fed in the diverting turnout 40 by a diverting element 21 either to the first filling unit 50 or the second filling unit 55. In the first and second filling unit 50, 55 is/are filled one medium 5 or more media 5 into the containers 3 by the use of filling valves 51, 52, 56, 57. Behind the second filling unit 55, the containers 3 may be passed for example to packaging, palletizing, as indicated by an arrow at the second filling unit 55. The labeling unit 60 can provide the containers 3 with labels 4 and comprises for this purpose first and second labeling carriages 61, 62. The containers 3 can be glass bottles, plastic bottles, cans, etc., in which a liquid and/or gaseous and/or solid medium 5 can be filled. The solid medium 5 can be present in the form of beads for example.

In the above-described container treatment plant 1, the positioning of the stretch blow molding machine 10, the transport star 20, the inspection unit 30, the diverting turnout 40, the first and second filling units 50, 55 and the labeling unit 60 is also selectable in another order than shown in FIG. 1 and described above. Further, it is not necessary that the container treatment plant 1 comprises all of the above-mentioned parts.

Figure 2:
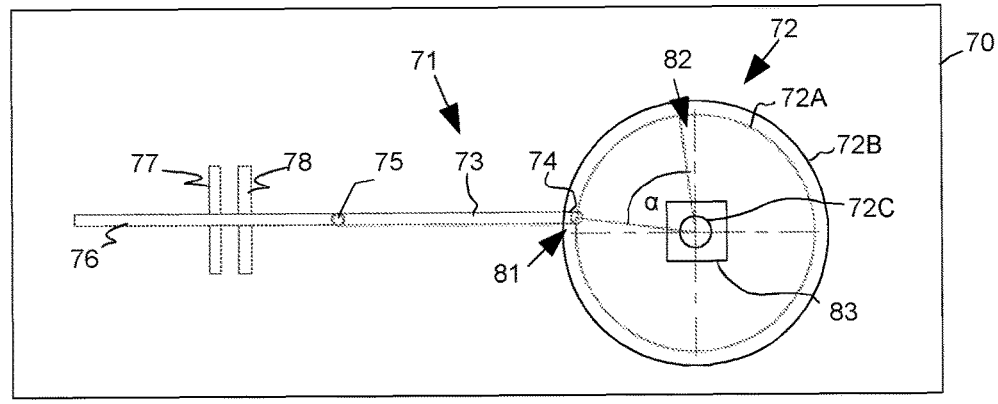
FIG. 2 shows a simplified view of a first position of a valve for the container treatment plant according to the first embodiment.

FIG. 2 shows a valve operating mechanism as quick switching valve or valve 70 that may be used as one of the filling valves 51, 52, 61, 62. The valve 70 has a displacing unit 71 comprising an actuator 72 and a deflectable rod 73 which is coupled at its one end with a coupling element 74 to the actuator 72, more precisely to its rotor 72A. The actuator 72 further comprises a stator 72B in which the rotor 72A can rotate around its axis 72C. The deflectable rod 73 is connected at its other end via a hinge 75 with a guiding rod 76. The guiding rod 76 is guided linearly between a first guide 77 and a second guide 78. The first and second guides 77, 78 are positioned in FIG. 2 transverse to the guiding rod 76, respectively. If the actuator 72 is powered with electric current, its rotor 72A will rotate between a first position 81 and a second position 82, which are spaced apart from each other by a rotation angle $\alpha$. The rotor 72A is rotated in FIG. 2 such that the guiding rod 76 and the deflectable rod 73 are located on a straight line. Consequently, the deflectable rod 73 is located in the first position 81 in which the deflectable rod 73 can be held by a fixing brake 83. In the first position 81, the valve 70 is closed.

Figure 3:
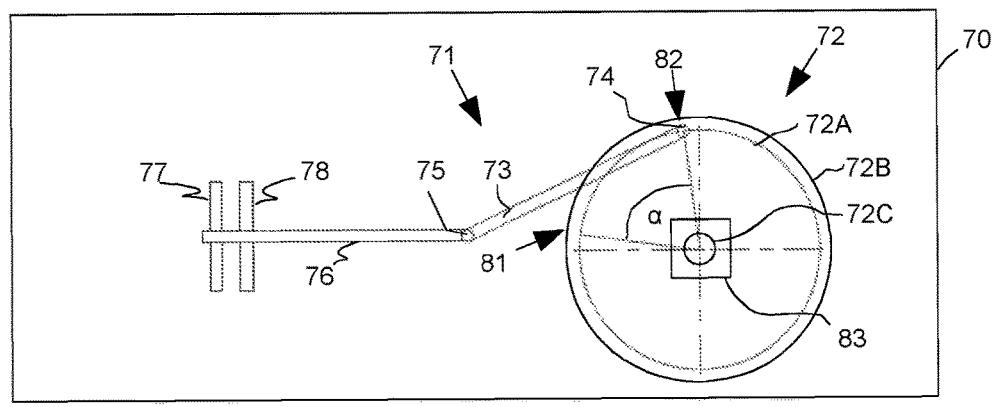
FIG. 3 shows a simplified view of a second position of the valve for the container treatment plant according to the first embodiment.

In contrast thereto, the rotor 72A is rotated in FIG. 3 such that the guiding rod 76 and the deflectable rod 73 are no longer located on a straight line but there is formed an angle between them which is smaller than 180° in direction to the second position 82. In FIG. 3, the coupling element 74 and due to this the corresponding end of the deflectable rod 73 is located in the second position 82 in which the deflectable rod 73 and thus also the guiding rod 76 can be held by the fixing brake 83, as well. In the second position 82 the valve 70 is opened or open.

Due to this, the mechanism built of the deflectable rod 73, coupling element 74, hinge 75, guiding rod 76 and guidings 77, 78 performs a transformation of the rotary motion of the actuator 72, more precisely its rotor 72A, into a translational motion or lifting motion of the guiding rod 76. The displacing unit 71 is also an electro mechanical drive for the guiding rod 76.

The actuator 72 is in this embodiment a 4-terminal or 4-pole direct current actuator which is designated also as magnet actuator or torque actuator. In the actuator 72 is effective a magnet field generated by an electric current in its stator 72B together with a magnet field of its rotor 72A. The rotor 72A can be implemented as a permanent magnet. The actuator 72 works thus with magnetism. Therewith, a torque is generated in the actuator 72 as long as the magnet transitions of its rotor 72A and stator 72B do not coincide completely. Thus, no rotation of the rotor 72A is generated, if the magnet transitions of the rotor 72A and the stator 72B coincide. Depending on the positioning of rotor 72A and stator 72B to each other, a rotation clockwise or counterclockwise can be generated with the actuator 72. Herein, the torque level is proportional to the intensity of the electric current flowing in the coils of the stator 72B of the actuator 72. The remaining torque that can result from, for example, friction and/or detent and/or magnetostatic force is very low for the actuator 72.

For example, the torque for the actuator 72 will be equal to zero, if one stator pole and one magnet pole of the rotor 72A are positioned directly in front of each other. This state is referred to as dead center. With increasing pole angle, the torque increases up to a maximum which is almost reached at approximately 8°, what corresponds to the first position 81 in FIG. 2 and FIG. 3. Up to an angle of approximately 82° which corresponds to the second position 82 in FIG. 2 and FIG. 3, the torque remains on this high level before it decreases again in the direction of zero in a further approaching of stator pole and rotor magnet and reaching the position of 90°. If the actuator 72 is operated between the both extreme values and, thus, also end positions, namely the first and second positions 81, 82, the rotation of the rotor 72A can be determined by simply reversing the voltage.

Consequently, the actuator 72 is operable between the two end positions, the two positions 81, 82 in FIG. 2 and FIG. 3. The usable region is herein located in an angle segment of up to 75°. The actuator 72 can reciprocate the mechanism built of the deflectable rod 73, coupling element 74, hinge 75 and guiding rod 76 guided by the guides 77, 78 between the both positions 81, 82 shown in FIG. 2 and FIG. 3, if necessary. Herein, also intermediate positions between the both positions 81, 82 can be reached and held by the fixing brake 83. For driving to or reaching the intermediate positions, an absolute value transmitter can be employed. In a filling valve 51, 52, 56, 57 that is implemented as valve 70, fast filling and slow filling as well as every desired flow rate depending on the medium 5 can thus be realized. The fixing brake 83 holds the actuator 72 and thus the mechanism connected therewith in the non-operating state in position, even if no displacement of the valve 70 is effected by the use of the actuator 72. The fixing brake 83 is in the embodiment a spring force brake, in particular a magnetically releasable spring force brake.

The valve 70 according to the present embodiment can be employed in the container treatment plant 1 for example as pusher 31, 32, 33 and/or in the transport star 20 and/or in the goad aggregate and/or in the hedgehog and/or in the label carriages 11, 12 and/or in diverting turnouts 40. Also the use in a unit package tulip control, as a gripper, etc. is possible.

Figure 4:
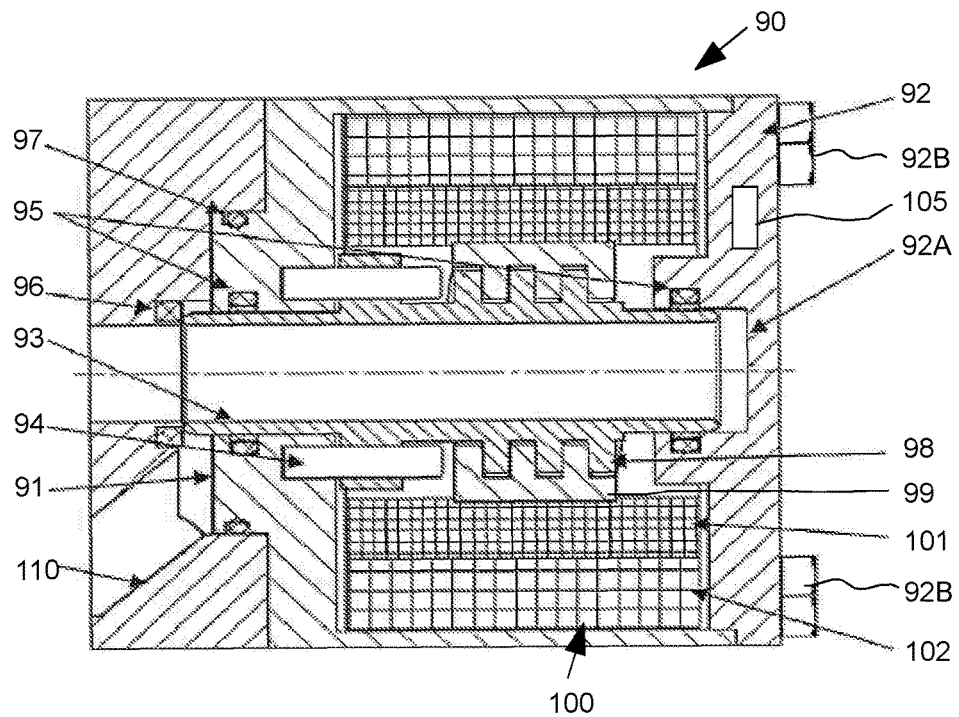
FIG. 4 shows a sectional view of a first position of a valve for the container treatment plant according to a second embodiment.
Figure 5:
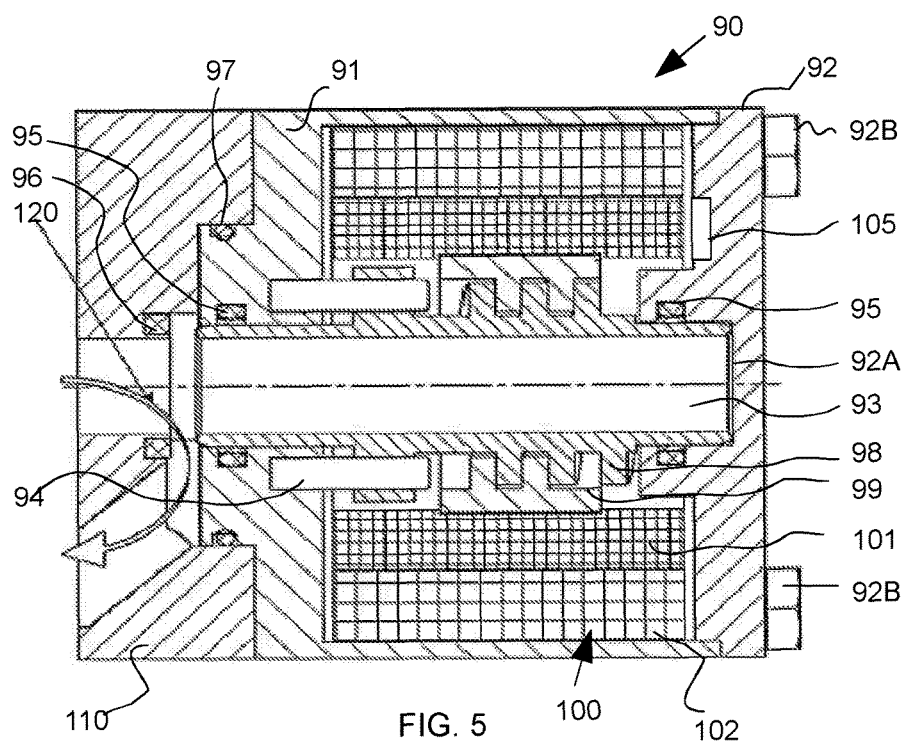
FIG. 5 shows sectional view of second position of the valve for the container treatment plant according to the second embodiment.

FIG. 4 and FIG. 5 show a valve 90 according to a second embodiment. Also the valve 90 is, as the valve 90 according to the first embodiment, a fast switching valve and can be employed as one of the filling valves 51, 52, 61, 62. The valve 90 can however also be a blowing valve 11, 12 of a stretch blow molding machine 10 of the container treatment plant 1. The valve 90 comprises a housing 91 having a cover 92. The cover 92 comprises a recess as stop 92A and is releasably fixed with fixing elements 92B to the housing 91. The housing 91 guides a tubular piston 93 along a linear guide 94. The tubular piston 93 is sealed with sealings 95 in respect to the housing 91. For the event that the valve 90 is a blowing valve 11, 12, the sealings 95 can seal, for example, up to 40 bar, wherein 1 bar=$10^5$ Pa. Further, a sealing 96 is provided between the tubular piston 93 and a control block 110. Between the housing 91 and the control block 110 is positioned an O-ring 97. At the tubular piston 93 is located an outer indentation 98 which mates into an inner indentation 99 of an actuator 100, more precisely its rotor 101. The rotor 101 in FIG. 4 and FIG. 5 has at least one rotor winding and can rotate in a stator 102 of the actuator 100 around the tubular piston 93 as an axis. Also the stator 102 in FIG. 4 and FIG. 5 comprises at least one stator winding. The actuator 100 is controlled by a control unit 105 which is integrated in the valve 90.

In FIG. 4, the closed position of the valve 90 is shown in which the tubular piston 93 is positioned spaced to the stop 92A in the cover 92 and at the control block 110.

In contrast thereto, FIG. 5 shows the opened position of the valve 90, in which the tubular piston 93 abuts to the stop 92A in the cover 92 or rests against the stop 92A. In the opened position in FIG. 5, for example, a medium 5 which can be filled in the container 3 of FIG. 1 can pass in the direction of the stream arrow 120 through the control block 110 passing the tubular piston 93 and the housing 91.

The actuator 100 of FIG. 4 and FIG. 5 is in its essential function the same like the actuator 72 of the first embodiment, so that it is referred herein to the description of the first embodiment. The actuator 100 is controlled by the control unit 105 correspondingly, as arises from the description of the first embodiment. Thus, also the valve 90 according to the second embodiment can be displaced by a rotation of the rotor 101. At the valve 90, the rotation of the rotor 101 is transformed by the outer indentation 98 of the tubular piston and the inner indentation 99 into a linear motion of the tubular piston as the element of the valve 90 which is to be displaced. The tubular piston 93 moves herein along the longitudinal axis of the actuator 100. The outer indentation 98 of the tubular piston and the inner indentation 99 of the rotor 101 can also be named as coupling unit. The outer indentation 98 of the tubular piston 93 is implemented in FIG. 4 and FIG. 5 as threaded rod or threaded tube. The inner indentation 99 is implemented correspondingly complementary thereto. The tubular piston 93 can also be implemented as threaded rod. Further, the tubular piston 93 can be implemented as pressure equalized tubular piston.

Consequently, also the actuator 100 can be operated between two end positions, the two positions of FIG. 4 and FIG. 5. The both end positions are spaced apart from each other by a rotation angle α, even if this angle is not depicted in FIG. 4 and FIG. 5. The dimension of the rotation angle α depends on the execution of the outer indentation 98 of the tubular piston 93 and the inner indentation 99 of the rotor 101. Thus, the actuator 100 can reciprocate the mechanism made of the outer indentation 98 of the tubular piston 93 and the inner indentation 99 guided by the linear guide 94 between the both positions shown in FIG. 4 and FIG. 5, if necessary. Herein, also intermediate positions between the both positions can be driven to or reached and held. Closing of the valve 90 is effected herein controlled by force. In the valve 90 is thus realized an electromechanic drive for the tubular piston 93.

Also in the present embodiment, the fixing brake 83 (cf. FIG. 2 and FIG. 3) can hold the actuator 100 in the non-operation position in position, even if no displacement of the valve 90 is effected by the use of the actuator 100. Therewith, the tubular piston 93 can be secured against a rotation around its own axis. The fixing brake 83 can thus also be designated as distortion lock. Also in the present embodiment, the fixing brake 83 is a spring force brake, in particular a magnetically releasable spring force brake. Further, the outer indentation 98 of the tubular piston 93 and the inner indentation 99 of the rotor 101 as transmission can be implemented self-locking. Herein, the play in the transmission can be displaceable. In particular, the transmission is displaced without play. The self-locking implementation of the transmission enables a secure closing of the valve 90 in the event of a breakdown of the electric current supply of the valve 90.

The displacement unit made of the tubular piston 93 comprising the outer indentation 98 and the inner indentation 99 of the rotor 101 is producible with low costs.

According to a modification of the second embodiment, the control unit 105 is not integrated into the valve 90. The control unit 105 is positioned peripheral in this case, in particular in striking distance to the valve 90. Alternatively or in addition, the control unit 105 can be a control unit which is positioned at a central position of the container treatment plant 1. The control unit 105 can be connected via a bus system with other control units or electric elements of the container treatment plant 1, to exchange data, for example.

Figure 6:
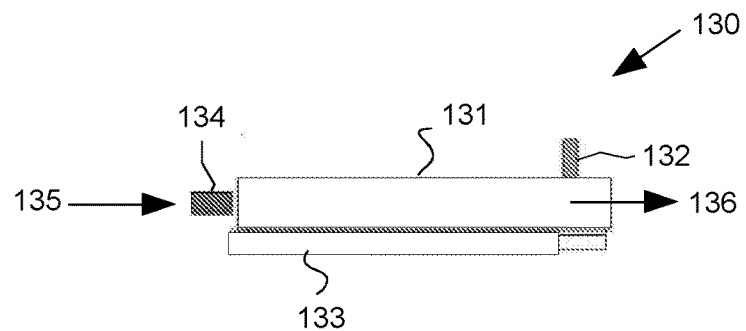
FIG. 6 shows a schematic view of a diverting unit for the container treatment plant according to a third embodiment.

FIG. 6 shows a diverting unit 130 according to a third embodiment. The diverting unit 130 can be, for example a pusher 31, 32, a diverting element 41, be used in a clamp 21, 22, 23 of the transport star, etc.

In the diverting unit 130 in FIG. 6 a spike 131 is linearly guided between a guide bearing 132 and a guide 133. By a mechanical activator 134 which strikes onto the spike 131 in direction of the arrow 135, the spike 131 can be moved in direction of the arrow 136.

Figure 7:
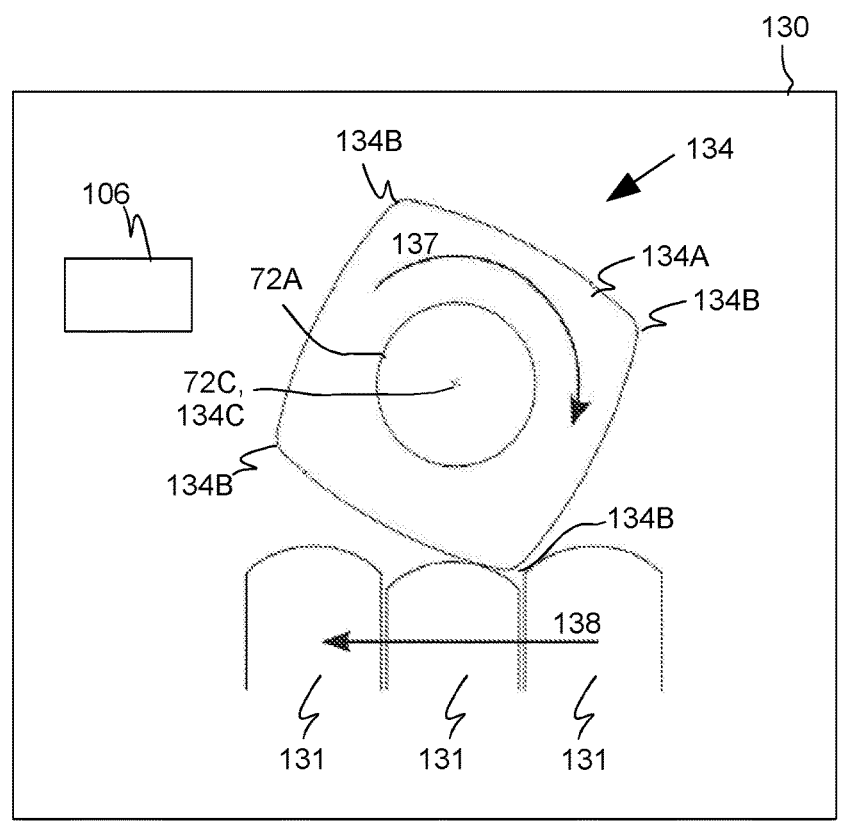
FIG. 7 shows a further schematic view of the diverting unit for the container treatment plant according to the third embodiment.

FIG. 7 shows the mechanical activator 134 according to the present embodiment in more detail. Consequently, the mechanical activator or the mechanism 134 comprises a cam disc 134A which comprises the four cams 134B and is rotatable in the direction of the rotation arrow 137 around its axis 134C. This is achieved by the rotor 72A of the actuator 72 which is coupled with the cam disc 134A correspondingly such that the axis 134C corresponds to the axis 72C of the rotor 72A of the actuator 72. Further, the cam disc 134A is positioned spaced to a row of spikes 131. Herein, the spikes 131 of FIG. 6 are positioned side by side along their length. Further, the spikes 131 can be moved along the arrow 138 as regards the cam disc 134A and therewith the actuator 72.

FIG. 7 further shows a control unit 106 which serves for controlling the actuator 72, the construction and function of which are described in more detail by reference to the first embodiment. The control unit 106 powers the actuator 72 with electric current such that its rotor 72A accelerates starting from a working point. In approaching another working point in direction of the rotating arrow 137, the control unit 106 switches the actuator 72 to a currentless state so that the rotor 72A moves through the other working point due to the mass inertia of the rotor 72A or the mass inertia of the mounted cam disc 134A as the load. Thereafter, the control unit 106 can operate the actuator 72 again with a voltage reversal in the same direction as before. In this way, a discrete concentric runout or true running of the actuator 72 around its axis 72C is caused which is in this embodiment the same as the axis 134C. Ideally, the rotor 72A is brought into a 45°-position as regards the stator pole, starting from which the actuator 72 is started. The actuator 72 has in this working point immediately its highest torque and accelerates therewith in the fastest way. After sweeping through the dead center at 90°, the actuator 72 is then catched at 135°.

Therefore, the cam disc 134A drivable by the actuator 72 is positioned as regards the row of diverting units such that a rotation of the cam disc 134A around its own axis due to an activation by the actuator 72 causes that one after another each one cam 134B of the cam disc 134A touches one of the spikes 131 and transfers it into a linear motion to move the spikes 131 from their first position into their second position. Thus, with the diverting unit 130 is realized an electromechanical drive for the spike 131. Herein, high clock frequencies can be achieved.

The spikes 131 are implemented rounded at their end faced to the cam disc 134A, as shown in FIG. 7. Therewith, the acceleration path for diverting the object to be diverted, as for example a container 3, can be increased, if a cam 134B of the cam disc 134A strikes one end of one of the spikes 131.

Thus, also a spike 131 of the diverting unit 130 according to the present embodiment can be displaced by a rotation of the rotor 72A of the actuator 72 between a first position and a second position. In FIG. 7 are located the both outer spikes 131 in the first position in which no container 3 is diverted. The middle spike 131 is located in the second position in which a container 3 is diverted. In the diverting unit 130, the rotation of the rotor 72A around a rotation angle α of approximately 90° is transformed, because of the cam disc 134A coupled with the rotor 72A as mechanism 134, in a linear motion of a spike 131 as the element of the diverting unit 130 which is to be displaced. In a rotary motion of the rotor 72A about a rotating angle α of 360°, four spikes 131 one after the other are transferred into a translational motion in the present embodiment.

According to a fourth embodiment, for example in the first filling unit 50, the filling valve 52 can be implemented as an aperture/dosing unit which is used for injecting or for continuously filling of nitrogen as medium 5 into filled beverage containers, like the container 3, before closing the container. Herein, dosing of fluid nitrogen can be effected by the aperture/dosing unit controlled by the actuator 72. For heat isolation of the actuator 72, the aperture/dosing unit can be made of ceramic material. In particular, a sterilization of the aperture/dosing unit is provided. The aperture/dosing unit can be opened, for example, individually shorter or longer according to the head space volume determined before. The head space volume in the beverage container might be determined by control systems, for example a camera, etc. before closing the beverage container, to adjust the dosing by nitrogen for each container individually.

Therewith, even an injection for container treatment plants with a power of more than 30.000/h is advantageously possible according to the present embodiment, in which container treatment plants was given up to now high consumption of fluid nitrogen with corresponding high costs, in particular, in a power over 30.000 containers per hour with continuous dosing.

According to the present embodiment an exact dosing of the fluid nitrogen is realizable even in high power, as for example a throughput of more than 30,000 containers per hour, whereby a reduction of the consumption of fluid nitrogen and thus a reduction of the costs results. In addition, a consideration of the filling height or the head space volume in the container is possible, whereby the different inner pressures of the closed container are not present anymore.

All of the above-described implementation forms of the container treatment plant 1, the valve 70, 90 of the diverting unit 130 and the aperture/dosing unit can be used separately or in all possible combinations thereof. In particular, all of the features of the above-described embodiments can be combined with each other arbitrarily. In addition, in particular, the following modifications are conceivable.

The elements shown in the figures are depicted schematically and can differ in a specific implementation from the forms shown in the figures provided that the above-described functions are ensured.

The container treatment plant 1 can further comprise other units than they are mentioned by reference to FIG. 1. In particular, the container treatment plant 1 can comprise a stretch blow molding machine 10 with a heating unit positioned upstream and/or a transport unit 20 and/or a labeling unit 60 and/or an inspection unit 30 and/or a filling unit 50, 55 and/or a cleaning unit and/or a packaging unit etc. or more thereof in the respective necessary order.

In case the valve 90 is a compressed air valve of a stretch blow molding machine of the container treatment plant 1, a data exchange can be performed between a stretching path control of a stretching rod and a control unit of the valve 70, 90.

The principle of the displacement of the both valves 70, 90 can also be applied to one diverting unit. Further, the principle of displacing the spikes 131 of the diverting unit 130 can be applied to a valve.

Before the start-up of the valve 70, 90, a reference drive can be performed to calibrate at least an end stop position of the valve 70, 90. Herein and/or in the operation of the container treatment plant 1, a force/path characteristic can be registered and/or visualized and/or analyzed.

The actuator 72 can be implemented as synchronous motor or step motor. In addition or alternatively, the actuator 100 can be implemented as synchronous motor or a step motor. Herein, an absolute value transmitter can be employed for driving to one or more positions with the actuator 72 and/or the actuator 100.

In the second embodiment, the materials for the tubular piston 93 and the guide 94 can be matched as follows. In case the tubular piston 93 is made of metal, the guide 94 is made of plastic. Otherwise, in case the tubular piston 93 is made of plastic, the guide 94 is made of metal.

In the second embodiment, the materials of the transmission made from the outer indentation 98 of the tubular piston 93 and the inner indentation 99 of the rotor 101 can be dimensioned such that the transmission functions without lubricants or only with an initial lubrication. In case the inner indentation 99 of the rotor 101 as a rotating element is made of plastic, the outer indentation 98 of the tubular piston 93 as a linearly moved element is made from metal. Otherwise, in case the inner indentation 99 of the rotor 101 as rotating element is made of metal, the outer indentation 98 of the tubular piston 93 as linearly moved element is made from plastic.

Furthermore, in the second embodiment, the sealing 96 or its sealing face can be made from a softer or harder material than the material of the tubular piston 93. To achieve a better tightness of the valve 90 a softer sealing by the sealing 96 is to be used.

The housing 91, which has the cover 92, of the valve 90 is preferably sealed against dust and fluid. In particular, the housing 91, which has the cover 92, satisfies at least in reference to the electric parts of the actuator 72 the requirements of IP 65 according to the European Standard EN 60529. The housing 90 and/or the cover can be cast parts, for example.

In the diverting unit 130, the cam disc 134A can comprise more or less than four cams 134B. The number of the cams 134B of the cam disc 134A complies in particular with the speed of the required motion, the width and/or form and/or material of the spikes, etc. It is further advantageous, if the number of the cams 134B of the cam disc 134A is equal to the number of the poles of the actuator 72, since each cam 134B is allotted one pole pair, then, and thus, one of the spikes 131 can be translationally displaced with one of the cams 134B.

Having described preferred embodiments of the invention, it will be apparent to those skilled in the art to which this invention relates, that modifications and amendments to various features and items can be effected and yet still come within the general concept of the invention. It is to be understood that all such modifications and amendments are intended to be included within the scope of the present invention.

What is claimed is:

1. A container treatment plant comprising:
    at least one element for treating containers, wherein the element is part of a valve; and
    a displacing unit for displacing the element between a first position and a second position,
    wherein the displacing unit comprises a magnetically operating actuator such that a rotary motion caused by the actuator displaces the element with the aid of a mechanism between a first position and a second position,
    and wherein the valve is a valve selected from the group consisting of a filling valve of a filling unit for filling at least one medium in a container and a blowing valve of a stretch blow molding machine.

2. The container treatment plant according to claim 1, wherein the mechanism is configured such that a rotary motion caused by the actuator is transformed into a linear motion between the first and second positions.

3. The container treatment plant according to claim 1, wherein the valve comprises a deflectable rod which is coupled in such a way with a rotor of the actuator and a guiding rod that a rotary motion caused by the actuator is transformed into a linear motion of the guiding rod, or
    wherein the valve has a tubular piston comprising an external indentation which is coupled with an inner indentation of the actuator such that a rotary motion caused by the actuator is transformed into a linear motion of the tubular piston.

4. The container treatment plant according to claim 3,
    wherein the external indentation is implemented as a threaded rod, and/or
    wherein the external indentation and the inner indentation form a transmission that is implemented self-locking and/or the play thereof is adjustable.

5. The container treatment plant according to claim 3, wherein the tubular piston is a tubular piston which is equilibrated as regards pressure and/or
    wherein the tubular piston comprises a rotation protection against rotating around its own axis.

6. The container treatment plant according to claim 3, wherein an electric control unit for controlling the actuator is integrated into the valve.

7. The container treatment plant according to claim 3, wherein the valve comprises a housing which comprises a housing cover and which is sealed against a pressure of up to approximately 40 bar and in which the displacing unit is mounted.

8. The container treatment plant according to claim 1, wherein the actuator is a 4-pole direct current actuator which is operable with magnetism between two positions.

9. A method for displacing an element of a valve or a diverting unit of a container treatment plant which comprises at least one element for treating containers, wherein the element is part of the valve or the diverting unit, wherein the method comprises the step of:
    displacing, by a displacing unit, of the element between a first position and a second position;
    wherein the displacing unit comprises a magnetically operating actuator such that a rotary motion caused by the actuator displaces the element with the aid of a mechanism between a first position and a second position,
    and wherein the valve is one selected from the group consisting of a filling valve of a filling unit for filling at least one medium in a container and a blowing valve of a stretch blow molding machine.

10. A container treatment plant comprising:
    at least one element for treating containers, wherein the at least one element is part of a diverting unit; and
    a displacing unit for displacing the at least one element between a first position and a second position,
    wherein the displacing unit comprises a magnetically operating actuator such that a rotary motion caused by the actuator displaces the element with the aid of a mechanism between a first position and a second position
    wherein a plurality of diverting units are arranged in one row side by side to each other, and
    wherein a cam disc drivable by the actuator is positioned in such a way relative to the row of diverting units that a rotation of the cam disc around an axis of the cam disc causes, by a rotation of the actuator, that every cam of the cam disc one after the other touches one of the diverting units and transfers the diverting unit corresponding therewith into a linear motion, to move the diverting unit from the first position into the second position.

11. The container treatment plant according to claim 10, wherein the mechanism is configured such that a rotary motion caused by the actuator is transformed into a linear motion between the first and second positions.

12. The container treatment plant according to claim 10, wherein the actuator is a 4-pole direct current actuator which is operable with magnetism between two positions.

13. The container treatment plant according to claim 10, further comprising a control unit for controlling the actuator, wherein said actuator has a rotor, such that said rotor accelerates starting from a working point and that the actuator is switched to a currentless state when approaching another working point, so that the rotor sweeps through said another working point due to the mass inertia of the rotor or the mass inertia of a mounted load and then the rotor can be operated again by a voltage reversal in the same direction as before to achieve a discrete true running of the actuator around an axis of the actuator.

14. The container treatment plant according to claim 10, wherein the at least one element is part of a transport star for transporting containers and/or a pusher and/or is part of a goad aggregate and/or part of a labeling carrier and/or part of a diverting turnout.

* * * * *